United States Patent
Jones

(10) Patent No.: US 9,639,375 B2
(45) Date of Patent: May 2, 2017

(54) GENERATION OF LANGUAGE BINDINGS FOR LIBRARIES USING DATA FROM COMPILER GENERATED DEBUG INFORMATION

(75) Inventor: Peter Jones, Arlington, MA (US)

(73) Assignee: Red Hat, Inc., Raleigh, NC (US)

( * ) Notice: Subject to any disclaimer, the term of this patent is extended or adjusted under 35 U.S.C. 154(b) by 1103 days.

(21) Appl. No.: 12/200,806

(22) Filed: Aug. 28, 2008

(65) Prior Publication Data

US 2010/0058305 A1 Mar. 4, 2010

(51) Int. Cl.
  G06F 9/45 (2006.01)
  G06F 9/44 (2006.01)
  G06F 9/54 (2006.01)

(52) U.S. Cl.
  CPC .......... G06F 9/4425 (2013.01); G06F 9/541 (2013.01)

(58) Field of Classification Search
  USPC .................. 717/136–161, 162–167
  See application file for complete search history.

(56) References Cited

U.S. PATENT DOCUMENTS

| | | | |
|---|---|---|---|
| 5,428,792 A * | 6/1995 | Conner et al. ............. | 717/143 |
| 5,872,973 A * | 2/1999 | Mitchell ............ | G06F 9/465 717/108 |
| 5,889,992 A * | 3/1999 | Koerber ................. | 717/108 |
| 6,066,181 A * | 5/2000 | DeMaster ............. | 717/148 |
| 6,083,282 A * | 7/2000 | Caron et al. ............ | 717/101 |
| 6,237,136 B1 * | 5/2001 | Sadahiro ............... | 717/110 |
| 6,314,429 B1 * | 11/2001 | Simser ................ | 717/163 |
| 6,425,118 B1 * | 7/2002 | Molloy et al. .......... | 717/136 |
| 6,438,744 B2 * | 8/2002 | Toutonghi .............. | 717/106 |
| 7,143,398 B2 * | 11/2006 | Chang et al. ............ | 717/137 |
| 7,213,236 B2 * | 5/2007 | Gibbons .............. | 717/136 |
| 2003/0120731 A1 * | 6/2003 | Weinberg et al. ......... | 709/205 |
| 2003/0177187 A1 * | 9/2003 | Levine ............... | A63F 13/10 709/205 |
| 2004/0103405 A1 * | 5/2004 | Vargas ................ | 717/137 |
| 2004/0261065 A1 * | 12/2004 | Abrams et al. ........... | 717/140 |
| 2005/0071852 A1 * | 3/2005 | Yoon ................ | G06F 9/4428 719/328 |
| 2006/0070043 A1 * | 3/2006 | Viega et al. ............ | 717/136 |
| 2006/0122958 A1 * | 6/2006 | Beisiegel et al. .......... | 707/1 |
| 2009/0019430 A1 * | 1/2009 | Jaeger et al. ............. | 717/141 |

* cited by examiner

*Primary Examiner* — Lewis A Bullock, Jr.
*Assistant Examiner* — Melissa Alfred
(74) *Attorney, Agent, or Firm* — Lowenstein Sandler LLP

(57) ABSTRACT

Described herein is a method and apparatus for generating automatic language bindings. The method includes receiving a request for a first program module in a first language from a second program module in a second language. A binding module is created in the second language in response to the request, where the binding module is generated from debug data of the first program module. The binding module is returned to the second program module. The second program module can then access the functionality of the first program module through use of the functions of the binding module.

21 Claims, 4 Drawing Sheets

US 9,639,375 B2

GENERATION OF LANGUAGE BINDINGS FOR LIBRARIES USING DATA FROM COMPILER GENERATED DEBUG INFORMATION

TECHNICAL FIELD

Embodiments of the present invention relate to a method and system for generating language bindings. Specifically, the embodiments of the present invention relate to a method and system for automatically generating language bindings at runtime using data from compiler generated debugging information.

BACKGROUND

On many platforms such as Linux® or Windows® by Microsoft Corp of Redmond, Wash. there are many libraries written in one language, typically C, that need to be used by programs written in another language, such as Perl, Python, C# by Microsoft Corp. or JAVA® by Sun Microsystems of Santa Clara, Calif. There are two solutions to this problem that are in use. Both of these solutions provide a compiled object, specific to the library being utilized, which sits in between the runtime language environment of the program requesting access to a library function and the library itself. One technique uses a system of templates from which code is generated that is compiled into a special library that can be loaded directly by a runtime language environment to access the functionality of the associated library. The generated code is fragile and must be reviewed by a programmer and often manually modified before compiling, which requires significant resources to be devoted to the maintenance of the special libraries.

The second technique is to write a new special library based on knowledge of the interfaces of a bound library such that the new special library can be loaded by a specific runtime language environment. This can require an even greater devotion of resources to generating the new special library. The new special libraries or 'shim layer' generated using both cases are commonly referred to as "language bindings," a specific language binding, such as "Python bindings," or just "bindings."

There are also several libraries or programs that enable executing programs to make calls to libraries in other languages on the fly. However, these libraries and programs require the program making the call to provide function definitions and related calling conventions to the intermediate library that then calls the appropriate library or generates the code to call the appropriate library. This requires prior knowledge of the programmers of the program that makes the library call to hard code these types of calls. However, if the libraries are recompiled or altered in any way subsequently, then the calls can fail. Examples of these systems include DllImport in C# runtime by Microsoft Corp., the 'libffi' library by Red Hat, Inc. of Raleigh, N.C. and the 'ctypes' library for Python.

Microsoft's C# runtime provides a mechanism called "DllImport", which makes use of code that functions analogously to libffi, and generates the calls on the fly from definitions you manually provide in your C# code. DllImport also has to specifically support the language from which it is importing such that it parses the declarations from the imported language directly.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for generating automatic language bindings. The method includes receiving a request for a first program module in a first language from a second program module in a second language. A binding module is created in the second language in response to the request, where the binding module is generated from debug data of the first program module. The binding module is returned to the second program module. The second program module can then access the functionality of the first program module through use of the functions of the binding module.

Figure 1:
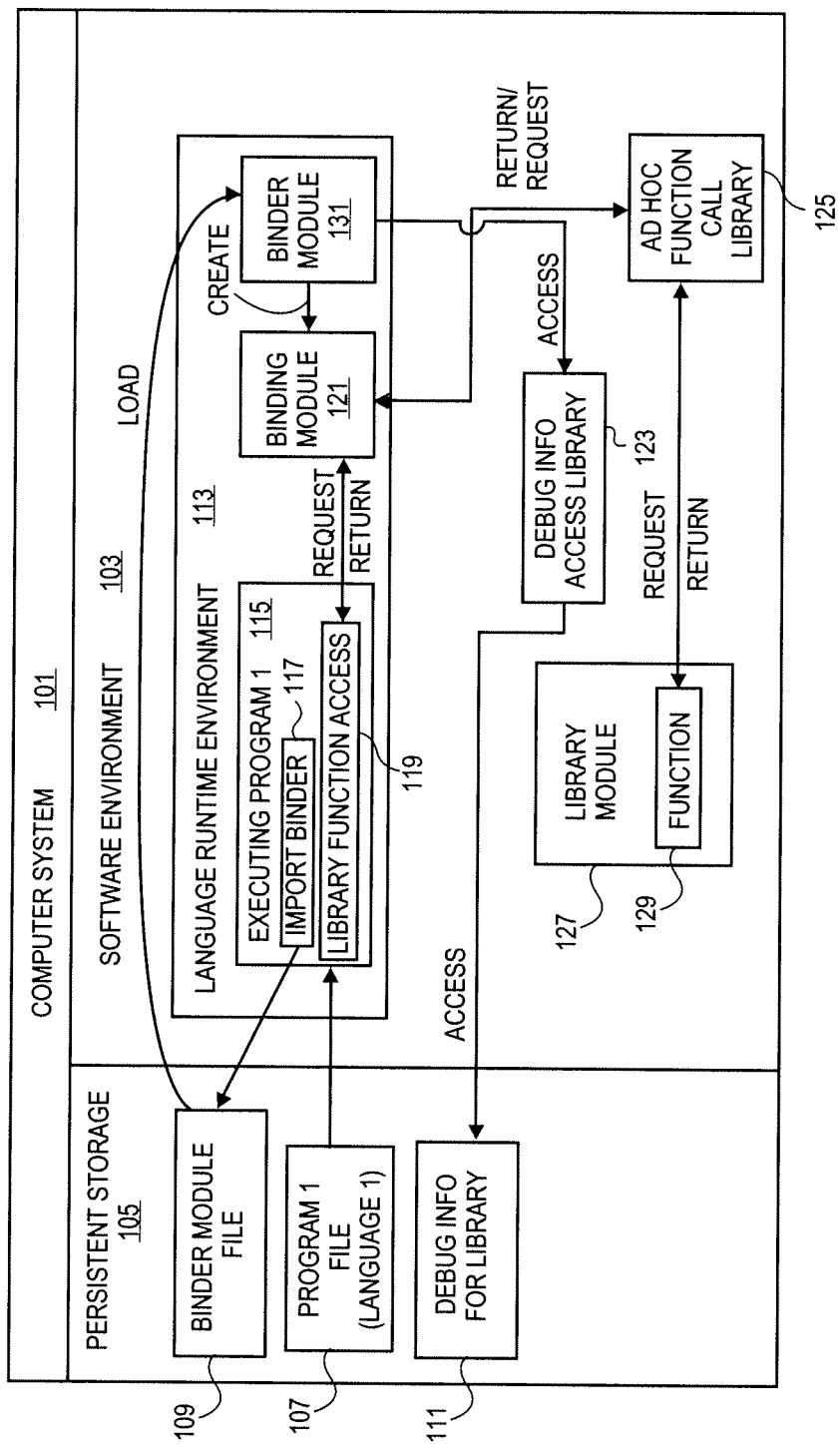
FIG. 1 is a diagram of one embodiment of a system for automatically generating language bindings.

FIG. 1 is a diagram of one embodiment of a system for automatically generating language bindings. The system is provided by a computer system 101. The computer system 101 can be a general purpose computer system such as a desktop computer, laptop computer, dedicated server, handheld device, console device, wireless device or similar system. In another embodiment, the computer system 101 is a specific purpose computing device that utilizes the automated language bindings. The computer system provides a software environment 103 and a persistent storage 105.

The persistent storage 105 can be any type of persistent storage device that is in communication with or a component of the computer system 101. The persistent storage 105 can be a set of fixed disks, memory modules or similar devices. A 'set,' as used herein, can refer to any whole number of items including one item. A fixed disk device can be a magnetic, optical or similar storage device. A memory module can be a static random access memory (RAM) module, a flash memory module, or similar type of memory module. The files and modules stored within the persistent storage 105 can be stored on the same storage device or on any number of separate persistent storage devices. These persistent storage devices 105 can be local to or remote from the physical location of the computer system 101. The persistent storage system 105 can store a program file 107 in a first language, a binder module file 109, debug information 111 and similar files and modules. A copy of the library module 127 file can also be stored within the persistent storage 105 as well as other components of the software environment 103. For sake of clarity, these other components have not been illustrated to avoid obscuring the relevant aspects of the invention.

The program file 107 is stored program code that is in a first language. The program file 107 can be code of any programming language including Python, Perl, C#, Java® or similar languages. In one embodiment, the languages are interpreted or non-compiled languages that are interpreted at run-time. In one embodiment, a binder module 109 can be coded in the same language as the program file 107. In another embodiment, the binder module 109 can be coded in another language such as C. The binder module file 107 is loaded to create a binder module 151 and binding module 121.

The debug information 111 for a library is a file or data structure that is generated by a compiler during the compilation of the library. The debug information contains information about the methods, procedures, functions, variables and similar information about the library. The debug information 111 can have any structure or format. Among this data in the debug information can be the list of functions that can be called, including their return types and the types of their parameters (these are referred to as "function prototypes"), and definitions of complex data structures used. Collectively this data is referred to as "calling conventions." In one embodiment, the debug information is in the debug with arbitrary record format (DWARF). In other embodiments, the debug information is in stabs, common object file format (COFF), relocatable object module format (OMF) or similar format.

The software environment 103 is a runtime environment that is established by a computer system 101 through a combination of resources including a set of processors or execution units, system memory, operating system, hardware peripherals and similar computer resources. The software environment 103 can be provided by a single computer system 101 or over a distributed system encompassing any number of discrete computer systems. The software environment 103 can support any number of executing modules, runtime environments and similar components. In one embodiment, the software environment 103 includes a language runtime environment 113 for the language of the program file 107, a debug information access library 123, an ad hoc function call library 125, a library module 127 and similar or supporting components.

The language runtime environment 113 can be a runtime environment for any programming language including Python, Perl, C#, Java® or similar languages 113. The language runtime environment 113 is utilized to execute a program file 107 written in the corresponding language. Any number of language runtime environments 113 for different languages can be provided by the computer system 101. The language runtime environment 113 loads a program file 107 to execute it. The loaded program file 107 becomes an executing program module 115.

The executing program 115 can include code that imports other modules and calls library functions of libraries in other programming languages. The import commands 117 are serviced by the language runtime environment 113 by loading the corresponding files. In the illustrated example, the executing program 115 includes an import command 117. The import command 117 indicates that the binder module 131 is to be loaded. The language runtime environment 113 finds the corresponding file 109 and loads it into the language runtime environment 113 thereby making the corresponding module 131 available in the language runtime environment 113.

During the import process of a binder module 131, the binder module 131 creates a binding module 121 for a specified library 127 and accesses debug information 111 for the specified library 127 to build a set of functions in the language of the language runtime environment that correspond to the functions 129 of a library module 127. In one embodiment, the binder module 131 uses a debug information access library 123 to assist it in accessing and analyzing the debug information 111. In one example embodiment, the debug information access library 123 is the 'libdw' of LINUX. In addition to setting up functions in the binding module 121 that correspond to those of the library module 127, the binder module 131 also generates methods, procedures or functions for the binding module 121 that provide access to variables and data structures of the library module 127.

The illustrated executing program 115 also includes a function call to library function 119. The library function call 119 may be in the form of a method, procedure or similar function call to the binding module 121. The binding module 121 services this function call by making a call to a corresponding function 129 of the library module 127. Similarly, variables and data structures of the library module 127 can be accessed through the binding module 121. In one embodiment, calls and access to the library module 127 are made using an ad hoc function call library 125. In one example embodiment, the ad hoc function call library 125 is the 'libffi' library by Red Hat.

Figure 2:
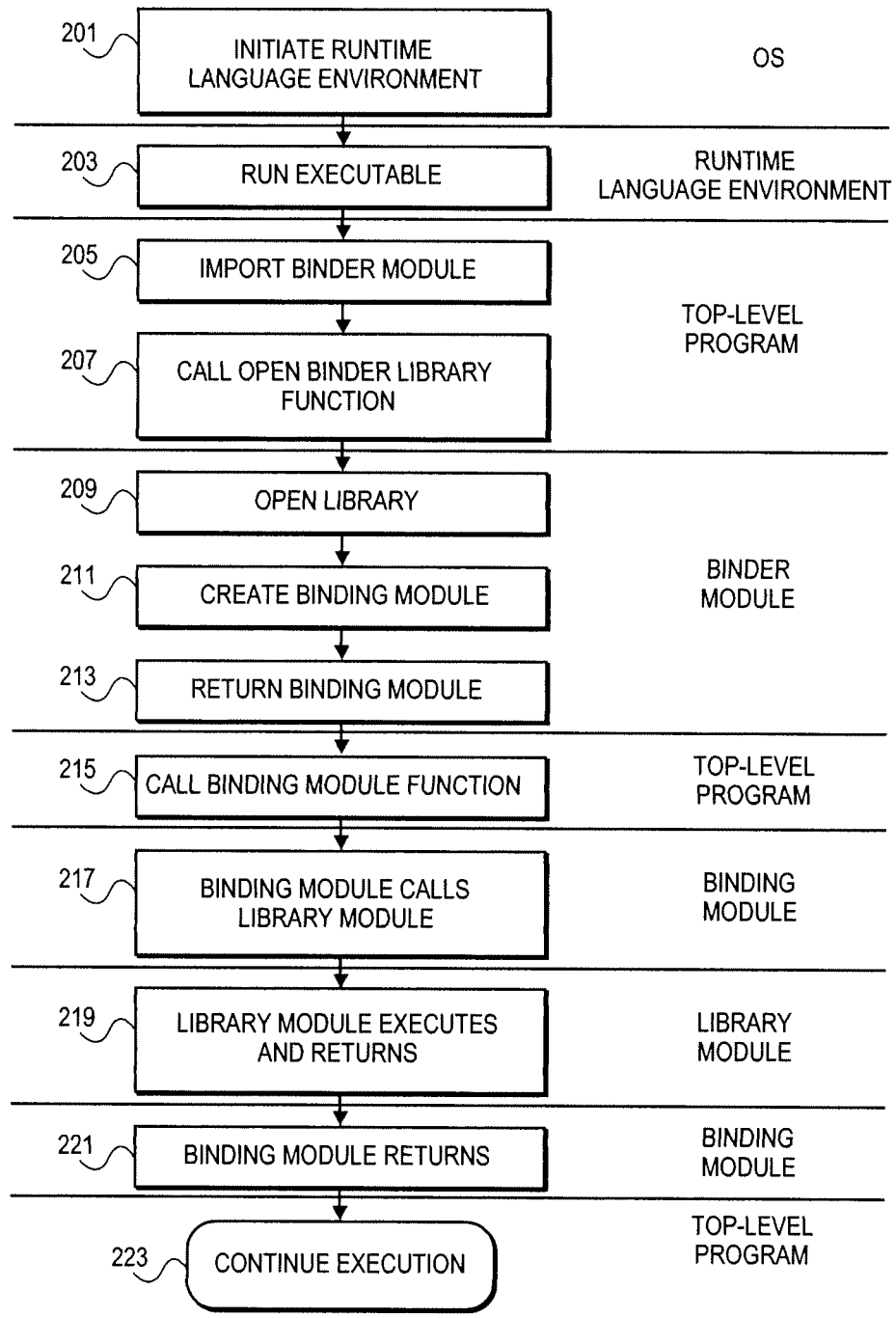
FIG. 2 is a flowchart of one embodiment of a process for automatically generating language bindings.

FIG. 2 is a flowchart of one embodiment of a process for automatically generating language bindings. In one embodiment, the process is initiated by a user or program that initiates the execution of a program by a language runtime environment (block 201). The language runtime environment and program can be associated with any programming language such as Python, Perl, C#, Java® or similar languages. The initiation of the language runtime is performed by the operating system of a computer system on which it is run. The operating system provides access to the resources of the computer system for the language runtime environment.

The language runtime environment then runs the executable program that was provided to it by the user or another program (block 203). The language runtime environment loads the program file of the indicated program. The method of the execution of the program file is dependent on the language implemented by the language runtime environment. The program that is executed is referred to herein for sake of convenience and clarity as a 'top-level program.' The program can be any type of program and does not necessarily have to reside at any particular level of any hierarchy.

The top-level program includes an 'import' command or similar command that is to be executed (block 205). The import command indicates that a particular module or program that is identified as a parameter of the command is to be utilized or accessed by the top-level program.

In this example embodiment, the relevant import command is to import the binder module. The runtime language environment in response to the 'import binder' command locates and loads the binder module. The import process can include a call to an open library function of the loaded binder module (block 207). The open library or 'open binder library' call initiates a process that analyzes the associated library debug information to generate a binding module for that library.

The binder module receives the open library function call (block 209). The binder module accesses the debug data and creates the new binding module (block 211) in response to the open library function call. The binder module iterates through the debug information of the library and creates methods, procedures, or similar functions in the new binding module to allow access to all of the variables, data structures and functions of the library module identified within the debug information. The resulting binding module is then ready for use and can be returned to the calling top-level program or made accessible in the language runtime environment.

The top-level program can then call the functions or access the variables or data structures of a library that is in a different language by calling the functions of the binding module (block 215). The top-level program calls a function of the binding module and in response the binding module calls a corresponding function of the library module (block 217). This process can be assisted by an ad hoc calling library. The binding module converts data types, adjusts function parameters and similarly prepares the data or function request of the top-level program for compatibility with the library module its language.

The library module receives the call from the binding module. The library module services the call (block 219) and returns the results of call to the binding module. The binding module converts data types, adjusts function parameters and similarly prepares the data returned from the library module for compatibility with the top-level program and its language. The binding module then returns the results to the top-level program (block 221). The top-level program can then utilize the requested data and continue with its normal functionality (block 223). The top-level program can be, include or be replaced for purposes of this description by any type of program including a user application, an operating system component, a networking program, a library, a video game, a loaded module or other program.

Figure 3:
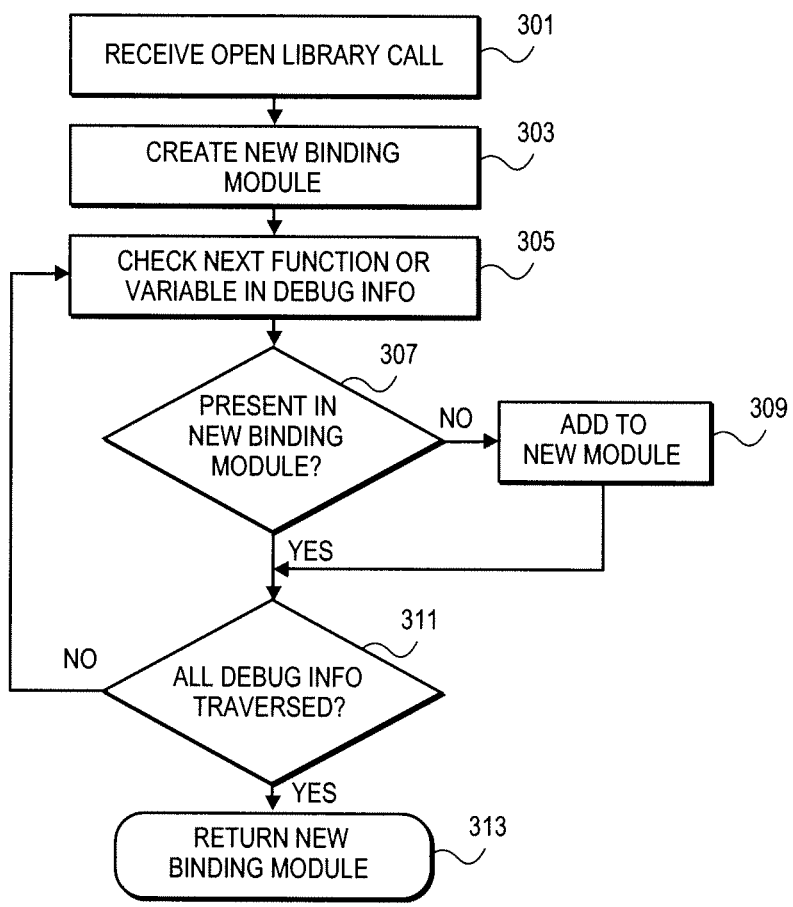
FIG. 3 is a flowchart of one embodiment of a process for creating a binding module.

FIG. 3 is a flowchart of one embodiment of a process for creating a binding module. In one embodiment, the binder module analyzes the data of the debug information during the import process. The analysis is initiated in response to receiving an open library call or similar function call (block 301). In other embodiments, this process is undertaken as a function or variable is accessed, on an ad hoc basis or at other times during execution. The binder module generates a new binding module to which the associated library functionality will be mapped (block 303). The binder module can access the debug data through a library that is designed to access the data format of the debug data.

The binder module starts the analysis by identifying a first function, variable or data structure in the debug information (block 305). The binder module checks the binding module to determine if the accessed function, variable or data structure already has been added to the binding module (block 307). If the function, variable or data structure is not present in the binding module then it is added to the binding module (block 309). The additional code can be generated as set code that is modified for the names, addressing and similar variations of the function, variable or data structure of the library. The types of data submitted as parameters and returned may also be converted to accommodate the formats of the respective languages of the library and program. Accessor functions can be created for data structures, such as accessor functions that create an object of a specific type, set a value in a data structure, or similarly modify, create or delete data structures or the data in the structures.

If the data is already present in the binding module or has just been added, then a check is made to determine if all of the data of the debug information has been traversed (block 311). If all of the data has not been traversed, then the process continues by accessing the next function, variable or data structure of the debug information (block 305). The traversal continues until all of the data has been exhausted. Once all of the data has been traversed, the modified binding module is returned to the calling program. The functions, variables and data structures of the library that have been added to the binding module are then accessible to the calling program through the binding module.

Figure 4:
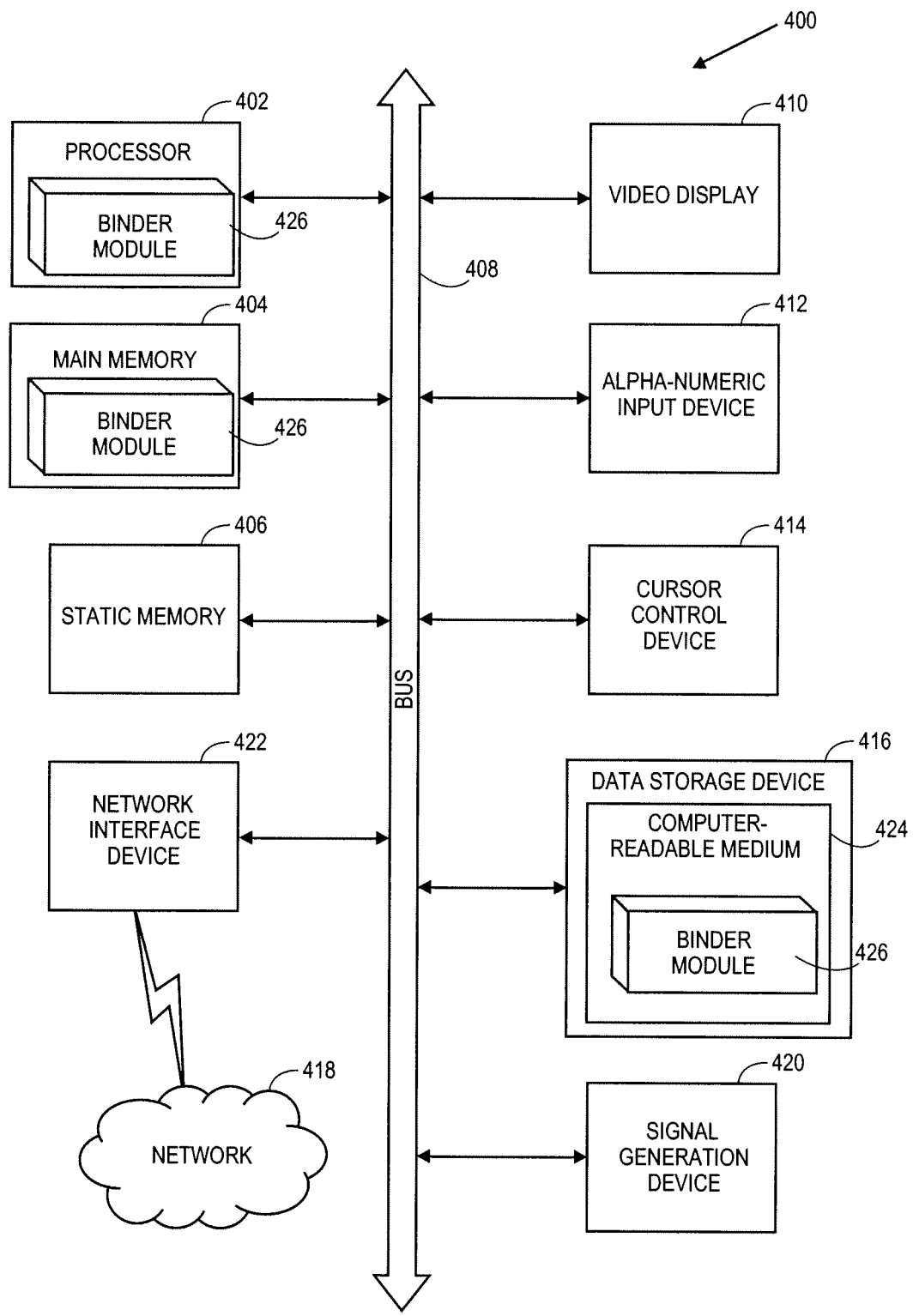
FIG. 4 is a diagram of one embodiment of a computer system for providing the binding module.

FIG. 4 is a diagram of one embodiment of a computer system for providing the binding module. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine (e.g., a client computer executing the top-level program and the server computer executing the binder module) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable medium), which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the language binding modules 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the language binding modules 426) embodying any one or more of the methodologies or functions described herein. The language binding modules 426 may also reside, completely or at least partially, within the main memory 404 and/or within the processing device 402 during execution thereof by the computer system 400, the main memory 404 and the processing device 402 also constituting machine-readable storage media. The language binding modules 426 may further be transmitted or received over a network 418 via the network interface device 422.

The machine-readable storage medium 424 may also be used to store the language binding modules 426 persistently. While the machine-readable storage medium 424 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "creating," "returning," "iterating," "adding," "importing," "calling," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for automatically generating language bindings has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:

receiving a request to access a first program component from a second program component at runtime of the second program component in a language runtime environment provided by a processing device wherein the first program component is in a first language, wherein the second program component and the language runtime environment are in a second language, and wherein the first language is different than the second language;

in response to receiving the request,
  automatically issuing an import command in the second program component and automatically importing, from a binder component file stored in persistent storage, a binder component in the second language into the language runtime environment in response to an import command in the second program component, during the importing of the binder component,
  automatically initiating a process to access and analyze debug data of the first program component, wherein the debug data is stored in the persistent storage, the debug data is generated by a compiler for the first language during compilation of the first program component, and wherein the debug data comprises calling-convention information for one or more functions in the first program component, and automatically creating, by the binder component in the language runtime environment, a binding component in the second language by iterating through the debug data of the first program component, wherein creating the binding component comprises determining, by the binder component, that a list of functions in the debug data identifies a first function and, in response, adding, by the binder component a second function to the calling-convention information of the first function in the debug data, wherein calling the second function in the binding component results in calling the first function in the first program component; and
returning the binding component to the second program component, wherein the second function in the binding component is callable by the second program component at runtime.

2. The method of claim 1, wherein the creating the binding component comprises automatically creating the binding component by the binder component without manually providing the calling-convention information for the functions of the first program component.

3. The method of claim 1, wherein the second function converts data or function types between the first language and the second language.

4. The method of claim 1, further comprising:
calling the second function of the binding component to access the first function of the first program component.

5. The method of claim 1, wherein the first program component is a library in a C programming language.

6. The method of claim 1, wherein the second program component is in the Python or C# programming language.

7. The method of claim 1, wherein the debug data is in a debug with arbitrary record format (DWARF), a stabs debug format, a common object file format (COFF), or a relocatable object format (OMF).

8. A non-transitory computer readable storage medium having instructions stored therein that, when executed by a processing device, cause the processing device to:
receive a request to access a first program component from a second program component at runtime of the second program component, in a language runtime environment provided by a processing device, wherein the first program component is in a first language, wherein the second program component and the language runtime environment are in a second language, and wherein the first language is different than the second language;
in response to receiving the request,
automatically issue an import command in the second program component and automatically import, from a binder component file stored in persistent storage, a binder component in the second language into the language runtime environment in response to an import command in the second program component,
during the import of the binder component,
automatically initiate a process to access and analyze debug data of the first program component, wherein the debug data is stored in the persistent storage, the debug data is generated by a compiler for the first language during compilation of the first program component, and wherein the debug data comprises calling-convention information for one or more functions in the first program component, and
automatically create, by the binder component in the language runtime environment, a binding component in the second language by iteration through the debug data of the first program component, wherein creating the binding component comprises determining, by the binder component, that a list of functions in the debug data identifies a first function and, in response, adding, by the binder component a second function to the calling-convention information of the first function in the debug data, wherein calling the second function in the binding component results in calling the first function in the first program component; and
return the binding component to the second program component, wherein the second function in the binding component is callable by the second program component at runtime.

9. The non-transitory computer readable storage medium of claim 8, wherein the creation of the binding component comprises automatic creation of the binding component without manual provision of the calling-convention information for the functions of the first program component.

10. The non-transitory computer readable storage medium of claim 8, wherein the second function converts data or function types between the first language and the second language.

11. The non-transitory computer readable storage medium of claim 8, wherein the processing device is further to:
call the second function of the binding component to access the first function of the first program component.

12. The non-transitory computer readable storage medium of claim 8, wherein the first program component is a library in a C programming language.

13. The non-transitory computer readable storage medium of claim 8, wherein the second program component is in the Python or C# programming language.

14. The non-transitory computer readable storage medium of claim 8, wherein the debug data is in a debug with arbitrary record format (DWARF), a stabs debug format, a common object file format (COFF), or a relocatable object format (OMF).

15. A system comprising:
an interface to receive a request to access a first program component from a second program component at runtime of the second program component in a language runtime environment provided by the processing device, wherein the first program component is in a first language, wherein the second program component and the language runtime environment are in a second language, and wherein the first language is different than the second language; and
the processing device operatively coupled to the interface and operatively coupled to a memory, the processing device to:
in response to receiving the request:
automatically import, from a binder component file stored in persistent storage, a binder component in the second language into the language runtime environment in response to an import command in the second program component;
initiate a process to access and analyze debug data of the first program component, wherein the debug data is stored in the persistent storage, the debug data is generated by a compiler for the first language during compilation of the first program component, and wherein the debug data comprises calling-convention information for one or more functions in the first program component;
create a binding component in the second language by the binder component in the language runtime environment wherein the binder component iterates through the debug data of the first program component, wherein creating the binding component comprises determining, by the binder component, that a list of functions in the debug data identifies a first function and, in response, adding, by the binder component a second function to the calling-convention information of the first function in the debug data, and wherein calling the second function in the binding component results in calling the first function in the first program component; and return the binding component to the to the second program component, wherein the second function in the binding component is callable by the second program component at runtime.

16. The system of claim 15, wherein the creation of the binding component comprises automatic creation of the binding component by the binder without manual provision of the calling-convention information for the functions of the first program component.

17. The system of claim 15, wherein the second function converts data or function types between the first language and the second language.

18. The system of claim 15, wherein the processing device is further to:

call the second function of the binding component to access the first function of the first program component.

19. The system of claim 15, wherein the first program component is a library in a C programming language.

20. The system of claim 15, wherein the second program component is in the Python or C# programming language.

21. The system of claim 15, wherein the debug data is in a debug with arbitrary record format (DWARF), a stabs debug format, a common object file format (COFF), or a relocatable object format (OMF).

* * * * *